(12) United States Patent
Ahuja et al.

(10) Patent No.: US 12,725,160 B2
(45) Date of Patent: Sep. 1, 2026

(54) SYSTEMS AND METHODS FOR PAYMENT THREAT MITIGATION

(71) Applicant: JPMORGAN CHASE BANK, N.A., New York, NY (US)

(72) Inventors: Dipti Ahuja, Basking Ridge, NJ (US); Bipin More, Edison, NJ (US); Jai Chawla, Livingston, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 145 days.

(21) Appl. No.: 18/353,444

(22) Filed: Jul. 17, 2023

(65) Prior Publication Data

US 2025/0029104 A1 Jan. 23, 2025

(51) Int. Cl.
*G06Q 20/40* (2012.01)

(52) U.S. Cl.
CPC ................................ *G06Q 20/4016* (2013.01)

(58) Field of Classification Search
CPC ................................................. G06Q 20/4016
USPC ...................................................... 705/35, 44
See application file for complete search history.

(56) References Cited

U.S. PATENT DOCUMENTS

2011/0196791 A1* 8/2011 Dominguez ........... G06Q 40/00 705/44
2018/0060869 A1* 3/2018 Kohli ................. G06Q 20/3674
2019/0034903 A1* 1/2019 Arora ..................... G06Q 20/02
2021/0049597 A1* 2/2021 Kumra ............... G06Q 20/3821
2021/0216976 A1* 7/2021 Kaufman ............. G06Q 20/405
2022/0414665 A1* 12/2022 Gelda .................... G06N 3/044
2023/0144173 A1 5/2023 St. Pierre et al.
2024/0119456 A1* 4/2024 Joseph ............... G06Q 20/4016

OTHER PUBLICATIONS

International Search Report and Written Opinion of the International Searching Authority, dated Nov. 6, 2024, from corresponding International Application No. PCT/US2024/03744.

* cited by examiner

*Primary Examiner* — William E Rankins
(74) *Attorney, Agent, or Firm* — GREENBERG TRAURIG LLP

(57) ABSTRACT

In some aspects, the techniques described herein relate to a method including: receiving, at a threat mitigation platform, payment information from a payment product application; providing the payment information to a threat analysis engine of the threat mitigation platform as input to the threat analysis engine; generating, as output of the threat analysis engine and based on the payment information, a threat identifier; querying, by an authorization engine, a threat repository using the threat identifier as a lookup key; receiving, by the authorization engine and from the threat repository, information associated with the threat identifier; and communicating the information associated with the threat identifier to the payment product application.

3 Claims, 4 Drawing Sheets

SYSTEMS AND METHODS FOR PAYMENT THREAT MITIGATION

BACKGROUND

1. Field of the Invention

Aspects generally relate to systems and methods for payment threat mitigation.

2. Description of the Related Art

Payment transactions may be induced by a variety of different fraudulent actions where threat actors persuade users of payment products to take actions that result in monetary payments to illegitimate parties. Generally, the users of the payment products are made to believe that a payment is being transferred to a legitimate payee. Once the payment is initiated and/or competed, there is often no way to cancel or reverse the payment that was made to the illegitimate party. To date, it has proved difficult to detect social engineering schemes by threat actors using technological systems, since there are few potential signals or warnings that can be presented to a user of a payment product that would cause the user to reconsider an imminent, illegitimate payment or that would block the payment or provide the payment product user with relevant information about the payee or history associated with the payee's information provided by the payment product user.

SUMMARY

In some aspects, the techniques described herein relate to a method including: receiving, at a threat mitigation platform, payment information from a payment product application; providing the payment information to a threat analysis engine of the threat mitigation platform as input to the threat analysis engine; generating, as output of the threat analysis engine and based on the payment information, a threat identifier; querying, by an authorization engine, a threat repository using the threat identifier as a lookup key; receiving, by the authorization engine and from the threat repository, information associated with the threat identifier; and communicating the information associated with the threat identifier to the payment product application.

In some aspects, the techniques described herein relate to a method, including: receiving, at the threat mitigation platform and from the payment product application, a response to the information associated with the threat identifier.

In some aspects, the techniques described herein relate to a method, wherein the response includes an acknowledgement of the information associated with the threat identifier.

In some aspects, the techniques described herein relate to a method, wherein the response includes an authorization for a requested payment specified in the payment information.

In some aspects, the techniques described herein relate to a method, including: recording, by the authorization engine, the authorization for the requested payment specified in the payment information in a data store.

In some aspects, the techniques described herein relate to a method, including: forwarding the requested payment to a payment network for processing of the requested payment.

In some aspects, the techniques described herein relate to a method, including: sending, by the authorization engine, a message to the payment product application, wherein the message indicates that the requested payment was successfully processed.

In some aspects, the techniques described herein relate to a system including at least one computer including a processor and a memory, wherein the at least one computer is configured to: receive, at a threat mitigation platform, payment information from a payment product application; provide the payment information to a threat analysis engine of the threat mitigation platform as input to the threat analysis engine; generate, as output of the threat analysis engine and based on the payment information, a threat identifier; query, by an authorization engine, a threat repository using the threat identifier as a lookup key; receive, by the authorization engine and from the threat repository, information associated with the threat identifier; and communicate the information associated with the threat identifier to the payment product application.

In some aspects, the techniques described herein relate to a system, wherein the at least one computer is configured to: receive, at the threat mitigation platform and from the payment product application, a response to the information associated with the threat identifier.

In some aspects, the techniques described herein relate to a system, wherein the response includes an acknowledgement of the information associated with the threat identifier.

In some aspects, the techniques described herein relate to a system, wherein the response includes an authorization for a requested payment specified in the payment information.

In some aspects, the techniques described herein relate to a system, wherein the at least one computer is configured to: record, by the authorization engine, the authorization for the requested payment specified in the payment information in a data store.

In some aspects, the techniques described herein relate to a system, wherein the at least one computer is configured to: forward the requested payment to a payment network for processing of the requested payment.

In some aspects, the techniques described herein relate to a system, wherein the at least one computer is configured to: send, by the authorization engine, a message to the payment product application, wherein the message indicates that the requested payment was successfully processed.

In some aspects, the techniques described herein relate to a non-transitory computer readable storage medium, including instructions stored thereon, which instructions, when read and executed by one or more computer processors, cause the one or more computer processors to perform steps including: receiving, at a threat mitigation platform, payment information from a payment product application; providing the payment information to a threat analysis engine of the threat mitigation platform as input to the threat analysis engine; generating, as output of the threat analysis engine and based on the payment information, a threat identifier; querying, by an authorization engine, a threat repository using the threat identifier as a lookup key; receiving, by the authorization engine and from the threat repository, information associated with the threat identifier; and communicating the information associated with the threat identifier to the payment product application.

In some aspects, the techniques described herein relate to a non-transitory computer readable storage medium, including: receiving, at the threat mitigation platform and from the payment product application, a response to the information associated with the threat identifier.

In some aspects, the techniques described herein relate to a non-transitory computer readable storage medium, wherein the response includes an acknowledgement of the information associated with the threat identifier.

In some aspects, the techniques described herein relate to a non-transitory computer readable storage medium, wherein the response includes an authorization for a requested payment specified in the payment information.

In some aspects, the techniques described herein relate to a non-transitory computer readable storage medium, including: recording, by the authorization engine, the authorization for the requested payment specified in the payment information in a data store.

In some aspects, the techniques described herein relate to a non-transitory computer readable storage medium, including: forwarding the requested payment to a payment network for processing of the requested payment; and sending, by the authorization engine, a message to the payment product application, wherein the message indicates that the requested payment was successfully processed.

DETAILED DESCRIPTION

Figure 1A:
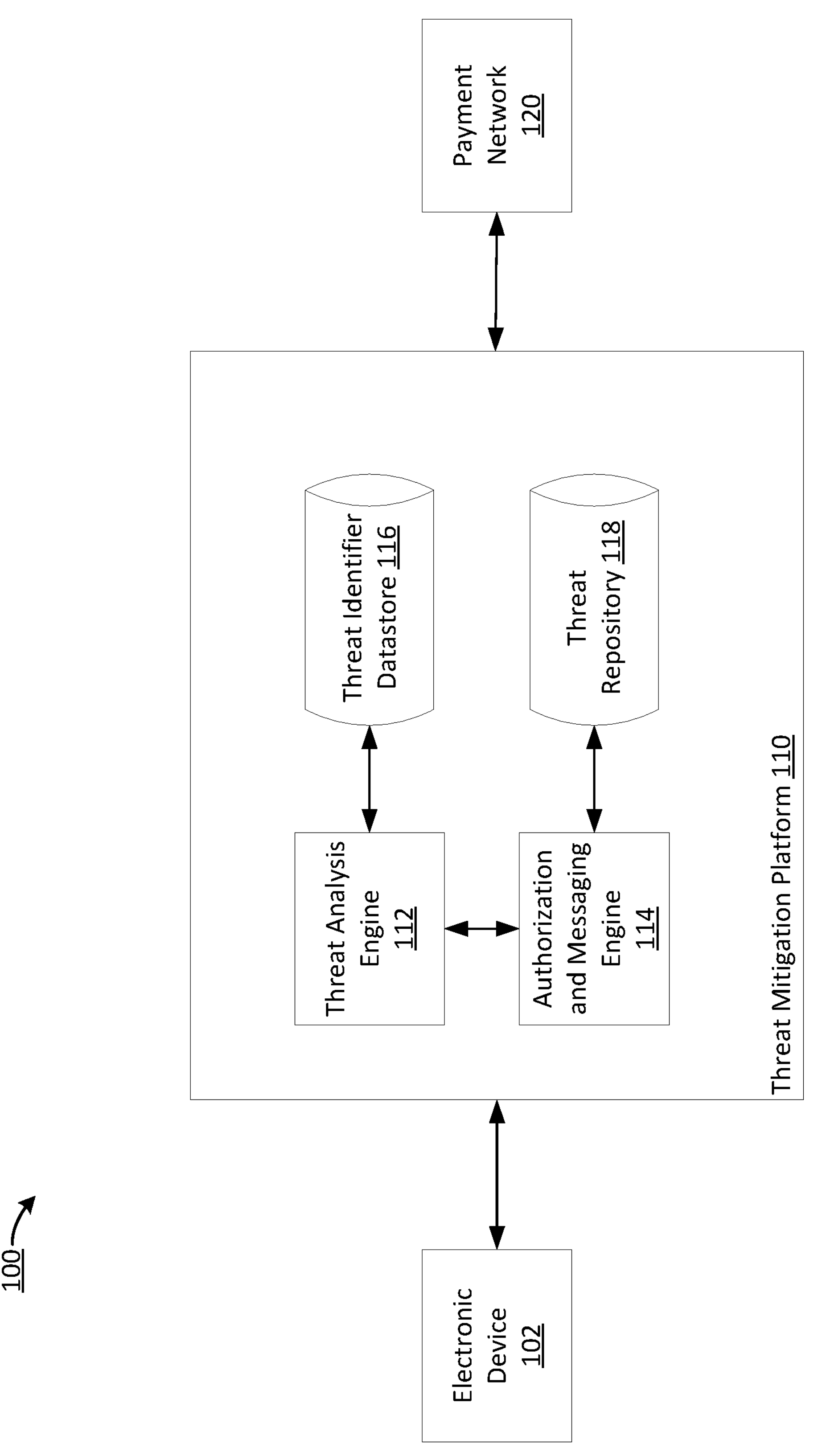
FIG. 1*a* is a block diagram of a system for threat mitigation in payment systems, in accordance with aspects.
Figure 1B:
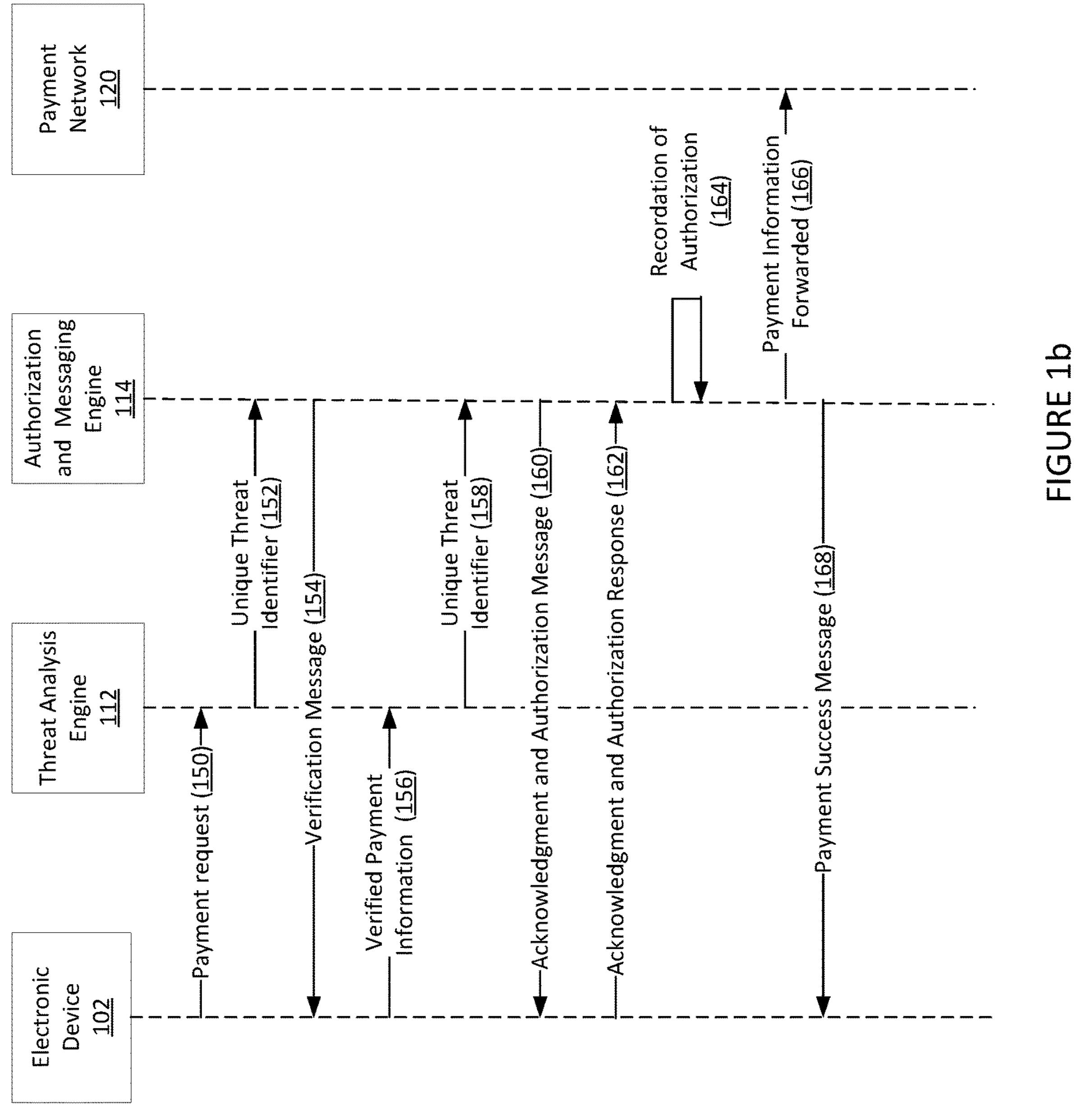
FIG. 1*b* is a sequence diagram for a payment threat mitigation process, in accordance with aspects.

Aspects generally relate to systems and methods for payment threat mitigation.

Aspects described herein include systems and methods that may collect information about a payment transaction initiated by a user using a payment product application and preemptively warn the user that a potential payment may be directed to an illegitimate or fraudulent party. Aspects may collect payee information provided at an interface of a payment product application and provide the collected information to a threat analysis engine of a threat mitigation platform that may analyze the provided information. Based on the analysis, a threat mitigation platform may determine whether to process the payment further, or decline processing the payment. In some aspects, relevant information may be provided to a user of a payment product application and/or a user consent to proceed with the payment (e.g., in light of the provided information) may be required of the payment product application user. A payment determination may be based on a risk scale that assigns a risk score to analyzed payee/payment information based on the collected information.

Exemplary payment products include application-based payment products and corresponding payment networks. Payment products may include a payment product application having a graphical user interface (GUI) that is hosted from a personal electronic device, such as a mobile device, or that is hosted from a web server and is accessed from a web browser. A payment product application and/or interface may be provided to a customer by a financial service organization that is partnered with a payment network provider or may be provided directly to a customer by the payment network provider. The payment product application may be in operative communication with a payment network that facilitates transfers of money between financial institutions.

In accordance with aspects, where a financial service organization provides a payment product application and/or interface to its customer, the application may be an integrated application that includes access to the customer's accounts and other services offered by the financial service organization and that additionally includes access to the payment product via a sub-interface or a multifaceted interface. In addition, where the payment product is integrated into a financial service organization's integrated application, the integrated application may also be in operative communication with other services provided by the financial service organization's technology backend.

In accordance with aspects, a technology backend of a financial services organization may provide an intermediate network (e.g., a computer network) that may interface with both the payment product application and the associated payment network and may receive payment requests from the payment product application and forward the requests to the payment network for fulfillment. A technology backend of a financial service organization or other organization may provide a threat mitigation platform that intercepts payment requests, including payee details, provided by a user of a payment product application, and may analyze the payee details to determine whether the provided payee details are associated with known fraud risks, and/or to provide a risk assessment based on the payee details.

In aspects where a payment network provider provides a payment product application directly to its customers, payee information may be analyzed by a threat mitigation platform and/or a threat analysis engine that is executed on the payment network provider's technology back and that analyzes the payee information before the payment network provider fulfills the payment request. In other aspects, a payment network may send the payee information to a third party for a threat/risk analysis as described herein and may receive the analysis from the third party and pass relevant information on to the user of the payment product application.

Aspects described herein may be applied with various types of payment product applications and/or interfaces. Exemplary payment product application types include payment applications that facilitate payment wires, Automated Clearing House (ACH) payments, products such as the Zelle® payment application/interface and network, and any payment product application that receives payee information from a user of the application via, e.g., an interface of a payment product application.

Exemplary payee information that may be collected at an interface of a payment product application may include information that identifies a payee. In some aspects, the payee may only be identified via an association with a bank account (e.g., a checking or savings account) related to the provided information. For instance, a telephone number or an electronic mail (email) address may be some or all of the identifying information given in a payment product application interface, and the unique telephone number or email address may be associated with a bank account including a bank account number. That is, a bank account may be identifiable via some or all of the unique identifying information. In some aspects, additional identifying information may be given via an application interface, such as the payee's name, address, etc. Various pieces of identifying information may be required or optional in different aspects.

In accordance with aspects, any payee information received by a threat mitigation platform may be considered when decisioning a payment made via a payment product application. Additionally, a monetary amount that will be transferred to a payee may be provided at a payment product application interface and may also be considered when decisioning a requested payment.

In accordance with aspects a user of a payment product application may initiate a request for a payment to a payee via an interface of the application. The request may include payee information such as a name, address telephone number, email address, etc. The request may further include a monetary amount that will be paid/transferred to an account associated with the payee identified by the provided payee information. The user of the payment product application may submit the payee and monetary amount information and initiate the payment process once all information has been entered via interaction with the application interface (e.g., by activating a button or other interface object of the interface). Upon initiation of the requested payment, the payee information and the monetary amount (collectively referred to as the payment information) may be sent to a technology backend of a provider of the payment product application.

The payment information may be received at a technology backend of a provider of a payment product application (e.g., a financial service organization, a provider of a payment network or payment services, etc.) Rather than conventionally authorizing and sending the received payment amount to a bank account associated with the received payee information, the received payment information may first be sent to a threat mitigation platform for analysis. A threat mitigation platform may include a threat analysis engine that may receive the payment information as input, process the payment information, and provide a risk summary as output. A threat analysis engine may include models, such as machine learning models, and/or rules-based logic that may receive payment information as input and provide a risk summary, or part of a risk summary, as output.

A machine learning model may be trained by a machine learning algorithm that fits historical payment information to the model so that the model may recognize one or more patterns in payment information received as input. Some of the patterns that a model may recognize may be tagged as fraudulent patterns (i.e., patterns that have been identified as fraud in the past). A model may be configured to provide output that is a prediction of whether the input data matches a fraudulent pattern or output that indicates a likelihood that input payment information is associated with a fraudulent actor or an illegitimate payment. For instance, output from a model may be a decimal number between 0.0 and 1.0, where the closer the output number is to 1.0, the higher the model's confidence is in the prediction. For example, an output number of 0.95 may indicate a high degree of confidence that input payment information is related to a fraud actor and/or that the requested payment is based on a fraudulent request or scenario.

Rules-based logic may include conditional logic that may be evaluated using received payment information as input. Comparisons of received payment information may be made to conditions defined in the logic, and based on a match or a mismatch, a particular action (i.e., a rule) may be executed. For instance, rules-based logic may include a datastore of unique identifiers (e.g., telephone numbers and/or email addresses) of known fraudulent actors. A payment information payload may include an email and/or a telephone number that matches an email or telephone number in the datastore of known fraudulent actors. The rules-based logic may execute a query of the datastore using the identifier as a lookup key, or otherwise compare a received identifier to identifiers known to be associated with fraudulent actors and, if a match is found, execute a corresponding rule (e.g., halt the payment process, provide the user with information, etc.).

In addition to identifying a known risk, or a high likelihood of a risk, a threat analysis engine may also determine a type of risk. Based on output from a machine learning model and/or rules-based logic, a threat analysis engine may provide a threat identifier. A threat identifier may be associated with a type of threat that a threat analysis engine has identified. For instance, when a threat analysis engine determines a threat associated with received payment information, the threat analysis engine may further identify a threat identifier that is associated with the determined threat. A threat analysis engine may have access to, e.g., a key-value pair datastore, where the determined threat is associated with a key and the key is a unique identifier of the identified threat. A threat analysis engine may look up the unique identifier from the key-value data store based on the determined threat and retrieve the unique identifier. A threat analysis engine may send the unique threat identifier to other components of a threat mitigation platform for further processing.

In accordance with aspects, a requested payment and corresponding payment information may be analyzed by a threat analysis engine and the threat analysis engine may determine a known risk, a risk score over a threshold, etc. In the case where a risk or a likelihood of a risk is determined, a threat analysis engine may send a message to an authorization service. The message may include a unique threat identifier that is associated with the threat determined by the threat analysis engine. A threat analysis engine may send information to an authorization service via a method call to an application programming interface (API) that is exposed by an authorization service. An API method of an authorization service may take a unique threat identifier as an argument or parameter of the exposed method.

In accordance with aspects, an authorization service may receive a unique threat identifier (e.g., as a parameter of an API method that the authorization service exposes) and may process the unique threat identifier further. Aspects may include a threat repository that may be a datastore that stores information related to types of threats. A threat repository may store a type of threat, a unique identifier or key for each unique threat type stored in the repository, a description of the threat, message text associated with a threat, etc. A unique threat identifier received by an authorization service from a threat analysis engine may match a key value in a threat repository. An authorization service may include a unique threat identifier received from a threat analysis engine in a query of a threat repository. Based on a query and an included threat identifier, information associated with the threat identifier may be returned from a repository. The information may include a description of the threat, message text associated with a threat, user instructions for dealing with a threat (e.g., next steps, consent requests, etc.).

In accordance with aspects, an authorization service may communicate information associated with a determined threat to a customer via a payment product application. For instance, an authorization service may format a description of a determined threat, a standardized message associated with a determined threat, user instructions associated with a determined threat, etc., into a message format that may be received and displayed by a payment product application (e.g., an interface of a payment product application), and may send the message to the payment product application. A payment product application may receive a message from an authorization service and may display the message to a user of the payment product application via an interface of the application.

In accordance with aspects, an authorization service may send several messages related to a determined threat to a payment product application for display to a user, and a user may prompt several messages back to an authorization service in response to messages received from an authorization service. Messages may be tiered. That is, some messages may be or fall into a first-tier category. First-tier messages may be messages that are sent in response to an initial payment request. For instance, in response to a determined threat, an authorization service may first send a first-tier message that prompts a user to verify payment details submitted in a payment request. A user may respond by verifying payment information. After processing a response to a first-tier message, a threat mitigation platform may determine an appropriate second tier message to send to a payment product application for display to a user. A response to a second-tier message may lead, after processing of a second-tier message response, to a third-tier message, and so on.

In an exemplary aspect, when an authorization service receives a response to a first-tier message prompting a user to verify payment information, an authorization service may re-submit the verified payment information that is received in response to the first-tier message to a threat analysis engine. The threat analysis engine may then re-analyze the provided information to determine if a threat is still present with the re-submitted (i.e., the verified) payment information. In some aspects, resubmitted (verified) payment information may only be resubmitted to a threat analysis engine if the information has changed or if new information has been added. In some aspects, a message may invite a user of a payment product application to provide additional payee details (e.g., details that may have not been submitted in an in initial or previous payment request). If a threat is still determined based on the verified and/or updated payment information, an authorization service may initiate another message send (e.g., a second-tier message) to the payment product application.

In accordance with aspects, a second-tier message may be sent by an authorization service in response to receipt of verified payment information and confirmation of a threat based on analysis of the verified payment information. A second-tier message may include instructions for a user of a payment product application to acknowledge that a threat/risk involving a requested payment has been identified and/or to provide consent for continued processing of a requested payment by an organization that provides the payment product. A second-tier message may be formatted and sent in the same or a similar way as a first-tier message (e.g., a message requesting verification of payment information). A user may respond to a message requesting an acknowledgment of a determined threat and/or a user's consent to proceed with the payment in light of a determined threat. Such a message may include a description of the threat, a disclaimer that the providing organization may not be responsible for payments to fraudulent/malicious actors, a reminder that processed payments may not be reversable, an option to cancel the payment request, an option to proceed with the payment request, etc.

In accordance with aspects, a platform may provide a process of sending a message to an interface, e.g., a first-tier message, in response to an identified threat, receiving a response from the interface, processing the response, and determining, based on the processing results (e.g., an output of processing) an appropriate next-tier message, and sending the appropriate next-tier message. Such a process may make as many iterations through as many tiers as is necessary or desirable until processing of a received message stops due to either a payment being approved and fulfilled, or a payment being canceled. A requested payment may be canceled by a user as a response to a message, or a requested payment may be canceled by a threat mitigation platform as a result of a particular type of threat being identified, a user failing to respond to a message, a series or messages to and from an interface that leads to a ML or rule-based cancelation of a payment, etc.

FIG. 1*a* is a block diagram of a system for threat mitigation in payment systems, in accordance with aspects. System 100 includes threat mitigation platform 110. Threat mitigation platform 110 includes threat analysis engine 112, authorization and messaging engine 114, threat identifier datastore 116, and threat repository 118. System 100 further includes electronic device 102 and payment network 120. Threat mitigation platform 110 may be provided by a financial service organization, a payment network provider, etc. Threat mitigation platform 110 may be provided as part of a providing organization's technology backend (i.e., a backend technology infrastructure).

A backend technology infrastructure of a providing organization may include servers, computers, software applications, computer network mediums, and computer networking hardware and software for providing electronic services based on computer software applications executing on requisite hardware. Exemplary hardware and software include webservers, application servers, database servers and database engines, communication servers such as email servers and SMS servers, network routers, switches and firewalls, custom-developed software applications (i.e., computer applications) including hardware to execute such applications on, etc.

In accordance with aspects, electronic device 102 may be a user device such as a smart phone, a tablet computer, a laptop computer, or any electronic device that is capable of storing and executing a computer application. A providing organization may further provide a payment product application that facilitates a payment request made from electronic device 102. A payment product application may further facilitate receipt and sending of messages via an interface of the application. A payment product application may be configured to execute on electronic device 102. Further, electronic device 102 may be configured to be in operative communication with a providing organization's backend technology infrastructure and threat mitigation platform 110.

In accordance with aspects, electronic device 102 and threat mitigation platform 110 may each be communicatively coupled to a public network such as the internet with appropriate hardware and software. For instance, electronic device 102 may include a wired or wireless network interface card (NIC) that interfaces with a public network and is configured with appropriate communication protocols. Likewise, hardware and software configurations included in threat mitigation platform 110 may include hardware (NICs, switches, routers, etc.) configured with appropriate protocols for intercommunication and with electronic device 102 over a public network. Threat mitigation platform 110 may be in operative communication with payment network 120 using similar components and configurations.

In accordance with aspects, electronic device 102 may execute a payment product application including an interface and a user of electronic device 102 may submit a payment request via an interface of the payment product application. The payment request may include payment information. The payment request including payment information may be sent to threat mitigation platform 110 and threat mitigation platform 110 may send the received payment request including payment information to threat analysis engine 112.

Threat analysis engine 112 may include a ML engine and/or a rules engine that executes rules-based logic. Payment information may be sent to threat analysis engine 112 as input data, and threat analysis engine 112 may execute a threat analysis on the payment information. A threat analysis may include processing of the payment information by a ML engine and/or a rules engine as described herein. Threat analysis engine 112 may provide, as output, a determination of a threat. A threat determination may be a risk of fraud, payment to a fraud actor or an illegitimate payee, or any threat or risk that a payment is not directed to its intended recipient or that an intended recipient is a fraud actor or other illegitimate actor.

Threat analysis engine 112 may be in operative communication with threat identifier datastore 116. Threat identifier datastore 116 may be a relational database, a key-value datastore, or any other suitable type of datastore. Threat analysis engine 112, upon determination of a threat based on payment information, may identify a unique threat identifier that is associated with the determined threat. For instance, threat analysis engine 112 may query threat identifier datastore 116 using include data in the identified threat to identifier a unique threat identifier that is associated with an identified threat. In an exemplary aspect, threat identifier datastore 116 is a key-value pair, where a key is a unique threat identifier and a corresponding value is data related to, describing, or otherwise included in a threat identified by threat analysis engine 112.

Threat analysis engine 112, upon identifying a unique threat identifier, may send the unique threat identifier to authorization and messaging engine 114. Authorization and messaging engine 114 may be responsible for determining an appropriate message to send to a payment product application. Authorization and messaging engine 114 may use a received unique threat identifier to lookup an appropriate message to send to an application executing on electronic device 102. Additionally, authorization and messaging engine 114 may include logic (e.g., rules-based logic) that indicates what messages are sent, processes responses to sent messages, and determines a next-tier message that should be sent.

In accordance with aspects, authorization and messaging engine 114 may retrieve one or more messages associated with a received unique threat identifier from threat repository 118. A received unique threat identifier may be used as a lookup key (e.g., a primary key) for retrieving one or more messages from threat repository 118. In some aspects, authorization and messaging engine 114 may further maintain a context with respect to an appropriate message tier. For instance, before a first message is sent a tier context may reflect that a messaging process is in a first-tier state, and an appropriate first-tier message may be retrieved and sent. After sending of a first-tier message, a tier context may be incremented to reflect a second-tier state. In some aspects, a current tier state may be used as an additional key, in conjunction with a unique threat identifier, to retrieve an tier-appropriate message or messages from threat repository 118.

In accordance with aspects, a processing cycle involving sending tier-appropriate messages to an application, receiving responses from the application, processing the received responses, and (if necessary) sending next-tier appropriate messages may end either when a payment is approved and sent for fulfillment, or when a threat mitigation platform determines that a requested payment should not be forwarded for fulfillment and suspends the payment process. If the payment process is suspended, a message indicating this may be sent to an application to notify a user of the payment product application.

For instance, threat analysis engine 112 may not determine a threat pattern for given payment information. In this case, authorization and messaging engine 114 may forward payment details to payment network 120 for fulfillment of the payment request. Moreover, threat mitigation platform 110 may send a message to electronic device 102 via a payment product application executing thereon that a requested payment has been made. In another example, threat analysis engine 112 may identify a threat for which rules indicate that the payment process should be halted (e.g., due to a known or extremely high likelihood of a risk/threat). In this scenario, the payment information may not be forwarded to payment network 120, and a message may be sent indicating the payment process has been canceled. A cancelation message may include other details such as the type of threat, etc. Cancelation may happen at any tier state and may depend on decisioning based on messaging and received responses to messages in any particular tier state.

FIG. **1*b* is a sequence diagram for a payment threat mitigation process, in accordance with aspects. At step 150, electronic device 102 sends a payment request to threat analysis engine 112. The payment request may be initiated by a user of electronic device 102 using a payment product application and included interface executing on electronic device 102. Threat analysis engine 112 may receive the payment request, including payment information, and may use the payment information as input to a threat analysis process. The threat analysis process may recognize a pattern with respect to the payment information and may determine a threat associated with the pattern. Threat analysis engine 112 may send a unique threat identifier associated with the determined threat to authorization and messaging engine 114 at step 152**.

Authorization and messaging engine 114 may retrieve a message (e.g., a first-tier message) and send the message to electronic device 102. Electronic device 102 may display the message on an interface of an executing payment product application. The message may prompt the user to verify the payment information. The application may prompt the user of electronic device 102 to verify the payment information. The user may interact with the interface provided by the application and displayed on electronic device 102 in order to verify the payment information and may send the verified payment information to threat analysis engine 112 in step 156.

Verified payment information may be processed to determine that the verified information is associated with a same threat or a different threat. This processing may be done as described herein and may be done by threat analysis engine 112 and/or authorization and messaging engine 114. In some aspects, a same or different unique threat identifier may be sent to authorization and messaging engine 114 in step 158. Authorization and messaging engine 114 may keep a tier context with a current tier state, and the tier state may indicate a second-tier state (having been incremented from a first-tier state after step 154). A second-tier message may be sent, at step 160, that prompts the user for acknowledgment of the determined threat and authorization to proceed with the requested payment in view of the threat. At step 162, the user may respond with an acknowledgement and authorization response. Authorization and messaging engine 114 may record the user's authorization at step 164 prior to proceeding with the payment. The recordation of authorization for the requested payment may be persisted in a datastore, a data log, etc., for later retrieval and verification. Once recordation of the user's authorization has been made, the payment information may be forwarded to payment network 120 for fulfillment of the payment request at step 166. A success message may be sent to the user at step 168.

Figure 2:
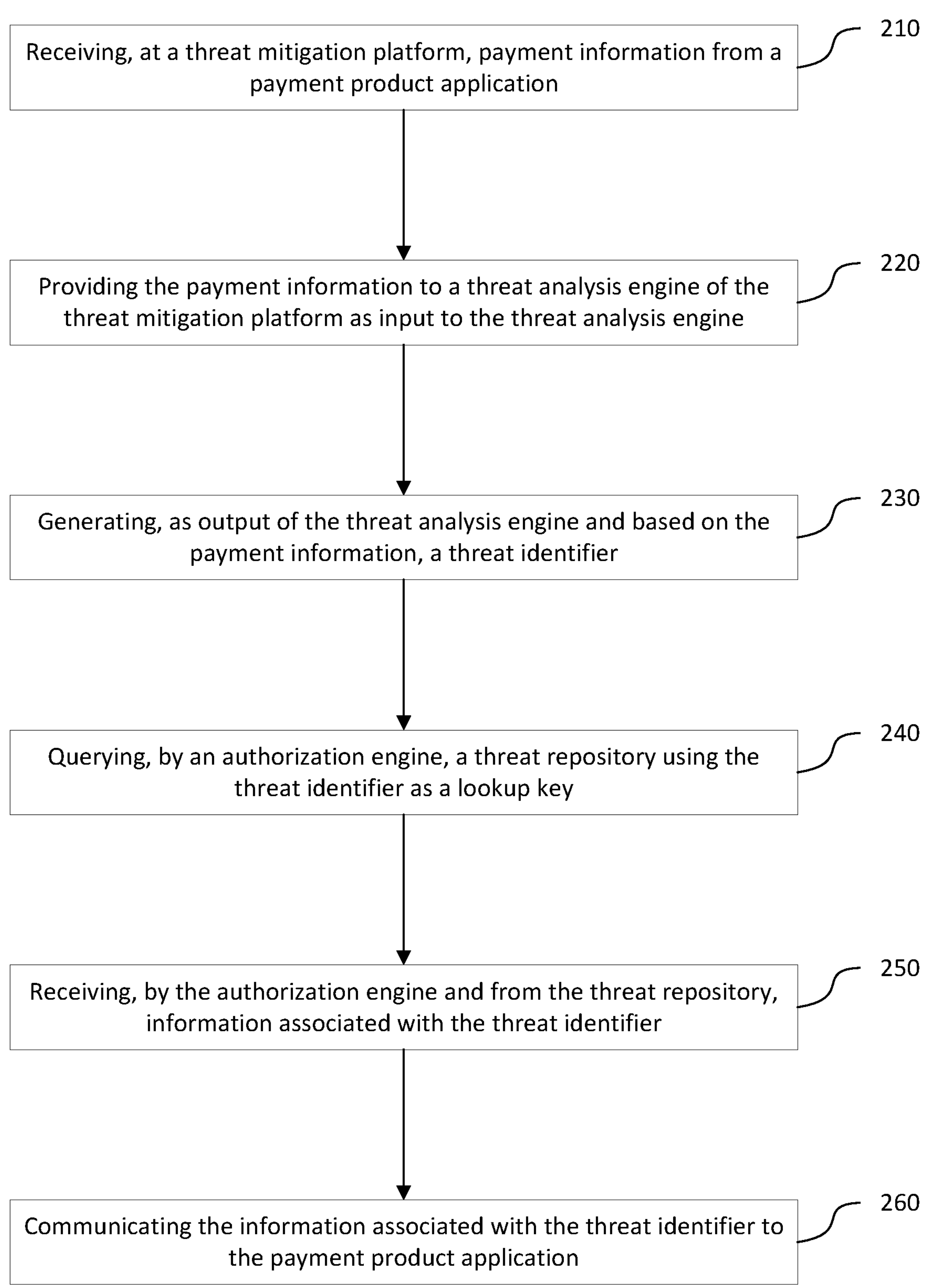
FIG. 2 is a logical flow of a payment threat mitigation process, in accordance with aspects.

FIG. 2 is a logical flow of a payment threat mitigation process, in accordance with aspects.

Step 210 incudes receiving, at a threat mitigation platform, payment information from a payment product application.

Step 220 incudes providing the payment information to a threat analysis engine of the threat mitigation platform as input to the threat analysis engine.

Step 230 incudes generating, as output of the threat analysis engine and based on the payment information, a threat identifier.

Step 240 incudes querying, by an authorization engine, a threat repository using the threat identifier as a lookup key.

Step 250 incudes receiving, by the authorization engine and from the threat repository, information associated with the threat identifier.

Step 260 incudes communicating the information associated with the threat identifier to the payment product application.

Figure 3:
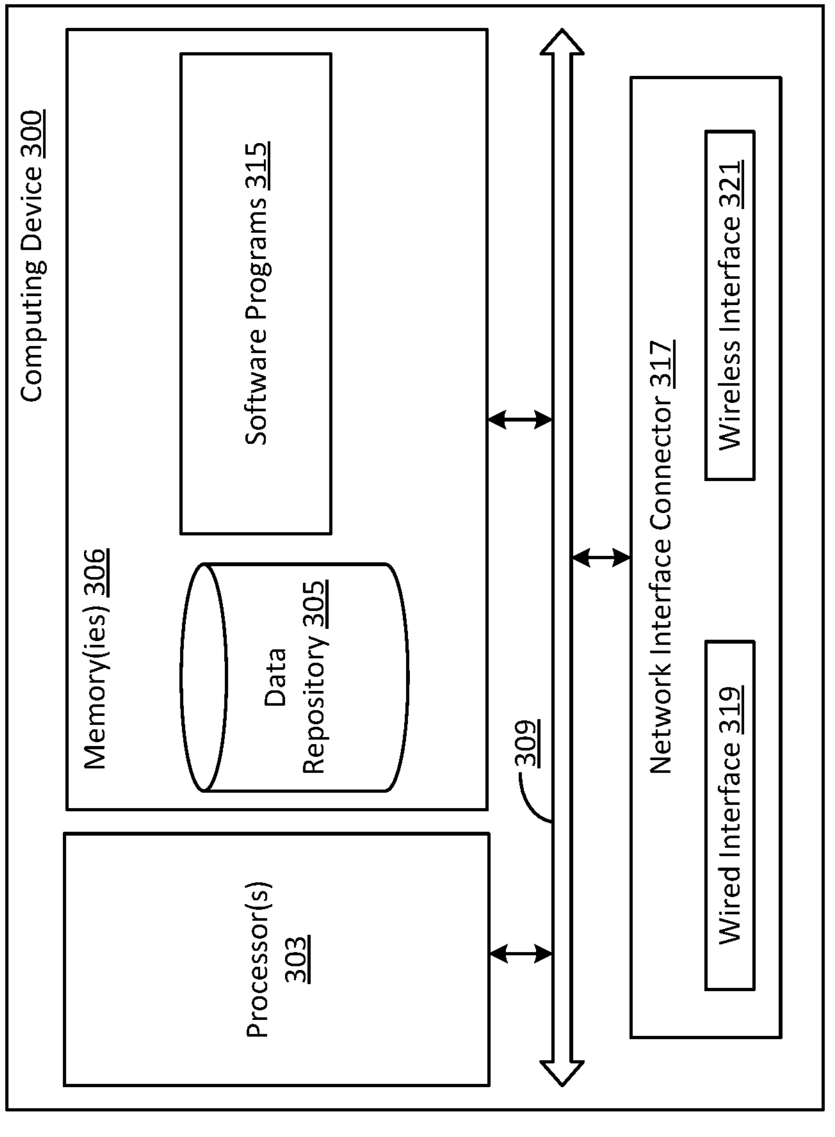
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a threat analysis engine, an authorization and messaging engine, an electronic device, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at a threat mitigation platform comprising a technology backend of a financial service organization, payment information of a potential payment from a payment product application, the payment information comprising a monetary amount to be paid and payee information including a name, an address, and a telephone number;

providing the payment information to a threat analysis engine of the threat mitigation platform as input to the threat analysis engine, the threat analysis engine comprising rules-based logic comprising a key-value datastore of unique identifiers of known fraudulent actors, the unique identifiers including telephone numbers and email addresses and a machine learning model trained on historical payment information to recognize a pattern in the payment information associated with fraud;

generating, as output of the threat analysis engine and based on the payment information processed through the rules-based logic and the machine learning model, a threat identifier comprising a type of threat based on a risk score calculated by the threat analysis engine being over a threshold based on the pattern and a probability of the risk score;

sending, by the threat analysis engine and to an authorization engine via a method call to an application programming interface (API) that is exposed by the authorization service, the threat identifier as a parameter of the exposed method call;

querying, by an authorization engine, a threat repository comprising the unique identifiers using the threat identifier as a lookup key of the key-value datastore to retrieve at least a threat description and a standardized message text associated with the threat identifier;

receiving, at the threat mitigation platform and from the payment product application, a response associated with the threat identifier, wherein the response includes an authorization for a requested payment specified in the payment information, wherein the response includes an authorization for a requested payment specified in the payment information;

maintaining, by the authorization engine, a tier context indicating a current message tier state;

sending, by the authorization engine and based on the tier context, a first-tier message prompting a user of the payment product application to verify the payment information;

receiving, at the threat mitigation platform, verified payment information;

re-submitting the verified payment information to the threat analysis engine;

upon confirmation of the threat based on the verified payment information, sending, by the authorization engine and based on the tier context, a second-tier message requesting an acknowledgment of the determined threat and an authorization to proceed with the requested payment in view of the threat; and receiving, at the threat mitigation platform and from the payment product application, a response including the authorization for the requested payment specified in the payment information;

recording, by the authorization engine, the authorization for the requested payment specified in the payment information in a data store;

receiving, by the authorization engine and from the threat repository, information associated with the threat identifier;

preventing forwarding of the requested payment to a payment network until after the recording and a rule evaluation are complete;

forwarding the requested payment to a payment network for processing of the requested payment; and executing, by the threat mitigation platform based on the information received by the authorization engine, a rule associated with a match of the threat identifier in the threat repository before the potential payment is executed, the rule comprising halting the potential payment when the threat identifier matches an entry in the threat repository.

2. A system comprising at least one computer including a processor and a memory, wherein the at least one computer is configured to:

receive, at a threat mitigation platform comprising a technology backend of a financial service organization, payment information of a potential payment from a payment product application, the payment information comprising a monetary amount to be paid and payee information including a name, an address, and a telephone number;

provide the payment information to a threat analysis engine of the threat mitigation platform as input to the threat analysis engine, the threat analysis engine comprising rules-based logic comprising key-value datastore of unique identifiers of known fraudulent actors, the unique identifiers including telephone numbers and email addresses and a machine learning model trained on historical payment information to recognize a pattern in the payment information associated with fraud;

generate, as output of the threat analysis engine and based on the payment information processed through the rules-based logic and the machine learning model, a threat identifier comprising a type of threat based on a known risk identified based on the pattern and a probability of the risk score;

sending, by the threat analysis engine and to an authorization engine via a method call to an application programming interface (API) that is exposed by the authorization service, the threat identifier as a parameter of the exposed method call;

query, by an authorization engine, a threat repository comprising the unique identifiers using the threat identifier as a lookup key of the key-value datastore to retrieve at least a threat description and standardized message text associated with the threat identifier;

receive, at the threat mitigation platform and from the payment product application, a response associated with the threat identifier, wherein the response includes an authorization for a requested payment specified in the payment information, wherein the response includes an authorization for a requested payment specified in the payment information;

maintain, by the authorization engine, a tier context indicating a current message tier state;

send, by the authorization engine and based on the tier context, a first-tier message prompting a user of the payment product application to verify the payment information;

receive, at the threat mitigation platform, verified payment information;

re-submit the verified payment information to the threat analysis engine;

upon confirmation of the threat based on the verified payment information, send, by the authorization engine and based on the tier context, a second-tier message requesting an acknowledgment of the determined threat and an authorization to proceed with the requested payment in view of the threat; and receive, at the threat mitigation platform and from the payment product application, a response including the authorization for the requested payment specified in the payment information;

record, by the authorization engine, the authorization for the requested payment specified in the payment information in a data store;

receive, by the authorization engine and from the threat repository, information associated with the threat identifier;

prevent forwarding of the requested payment to a payment network until after the recording and a rule evaluation are complete;

forward the requested payment to a payment network for processing of the requested payment; and execute, by the threat mitigation platform based on the information received by the authorization engine, a rule associated with a match of the threat identifier in the threat repository before the potential payment is executed, the rule comprising halting the potential payment when the threat identifier matches an entry in the threat repository.

3. A non-transitory computer readable storage medium, including instructions stored thereon, which instructions, when read and executed by one or more computer processors, cause the one or more computer processors to perform steps comprising:

receiving, at a threat mitigation platform comprising a technology backend of a financial service organization, payment information of a potential payment from a payment product application, the payment information comprising a monetary amount to be paid and payee information including a name, an address, and a telephone number;

providing the payment information to a threat analysis engine of the threat mitigation platform as input to the threat analysis engine, the threat analysis engine comprising rules-based logic comprising key-value datastore of unique identifiers of known fraudulent actors, the unique identifiers including telephone numbers and email addresses and a machine learning model trained on historical payment information to recognize a pattern in the payment information associated with fraud;

generating, as output of the threat analysis engine and based on the payment information processed through the rules-based logic and the machine learning model, a threat identifier comprising a type of threat based on a known risk identified based on the pattern and a probability of the risk score;

sending, by the threat analysis engine and to an authorization engine via a method call to an application programming interface (API) that is exposed by the authorization service, the threat identifier as a parameter of the exposed method call;

querying, by an authorization engine, a threat repository comprising the unique identifiers using the threat identifier as a lookup key of the key-value datastore to retrieve at least a threat description and standardized message text associated with the threat identifier;

receiving, at the threat mitigation platform and from the payment product application, a response associated with the threat identifier, wherein the response includes an authorization for a requested payment specified in the payment information, wherein the response includes an authorization for a requested payment specified in the payment information;

maintaining, by the authorization engine, a tier context indicating a current message tier state;

sending, by the authorization engine and based on the tier context, a first-tier message prompting a user of the payment product application to verify the payment information;

receiving, at the threat mitigation platform, verified payment information;

re-submitting the verified payment information to the threat analysis engine;

upon confirmation of the threat based on the verified payment information, sending, by the authorization engine and based on the tier context, a second-tier message requesting an acknowledgment of the determined threat and an authorization to proceed with the requested payment in view of the threat; and receiving, at the threat mitigation platform and from the payment product application, a response including the authorization for the requested payment specified in the payment information;

recording, by the authorization engine, the authorization for the requested payment specified in the payment information in a data store;

receiving, by the authorization engine and from the threat repository, information associated with the threat identifier;

prevent forwarding of the requested payment to a payment network until after the recording and a rule evaluation are complete;

forwarding the requested payment to a payment network for processing of the requested payment; and executing, by the threat mitigation platform based on the information received by the authorization engine, a rule associated with a match of the threat identifier in the threat repository before the potential payment is executed, the rule comprising halting the potential payment when the threat identifier matches an entry in the threat repository.

* * * * *